United States Patent [19]

Tidwell

[11] Patent Number: 4,742,885

[45] Date of Patent: May 10, 1988

[54] FORK STABILIZER FOR MOTORCYCLE

[76] Inventor: Kelly Tidwell, 5842 McFadden suite 0, Huntington Beach, Calif. 92649

[21] Appl. No.: 58,170

[22] Filed: Jun. 4, 1987

[51] Int. Cl.[4] .............................................. B62K 19/24
[52] U.S. Cl. .................................. 180/219; 280/276; 280/279
[58] Field of Search ............... 280/274, 275, 277, 279, 280/280, 281 R; 180/219

[56] References Cited

U.S. PATENT DOCUMENTS

| 4,479,661 | 10/1984 | Weigl | 280/279 |
| 4,512,592 | 4/1985 | Yoshioka | 280/279 |
| 4,705,285 | 11/1987 | Yoshida | 280/279 |

Primary Examiner—John J. Love
Assistant Examiner—Donn McGiehan
Attorney, Agent, or Firm—Blakely, Sokoloff, Taylor & Zafman

[57] ABSTRACT

A fork stabilizer for the front-end fork of a motorcycle is provided. The fork stabilizer includes an elongate member, comprised of unitary metallic material having a substantially solid cross-sectional area, the elongate member also having transverse curved areas disposed at each end of the elongate member, said curved areas being closely machined to make a net fit between the prongs of the front-end fork of the motorcycle, having bolt holes disposed at each corner thereof, said bolt holes having an expanded region adapted to receive the heads of said bolts and also having a restricted region adapted to retain the elongate portion of said bolts whereby the twisting forces are substantially reduced, thereby assuring smooth and continuous operation and steering of said front-end fork.

4 Claims, 1 Drawing Sheet

U.S. Patent   May 10, 1988   4,742,885
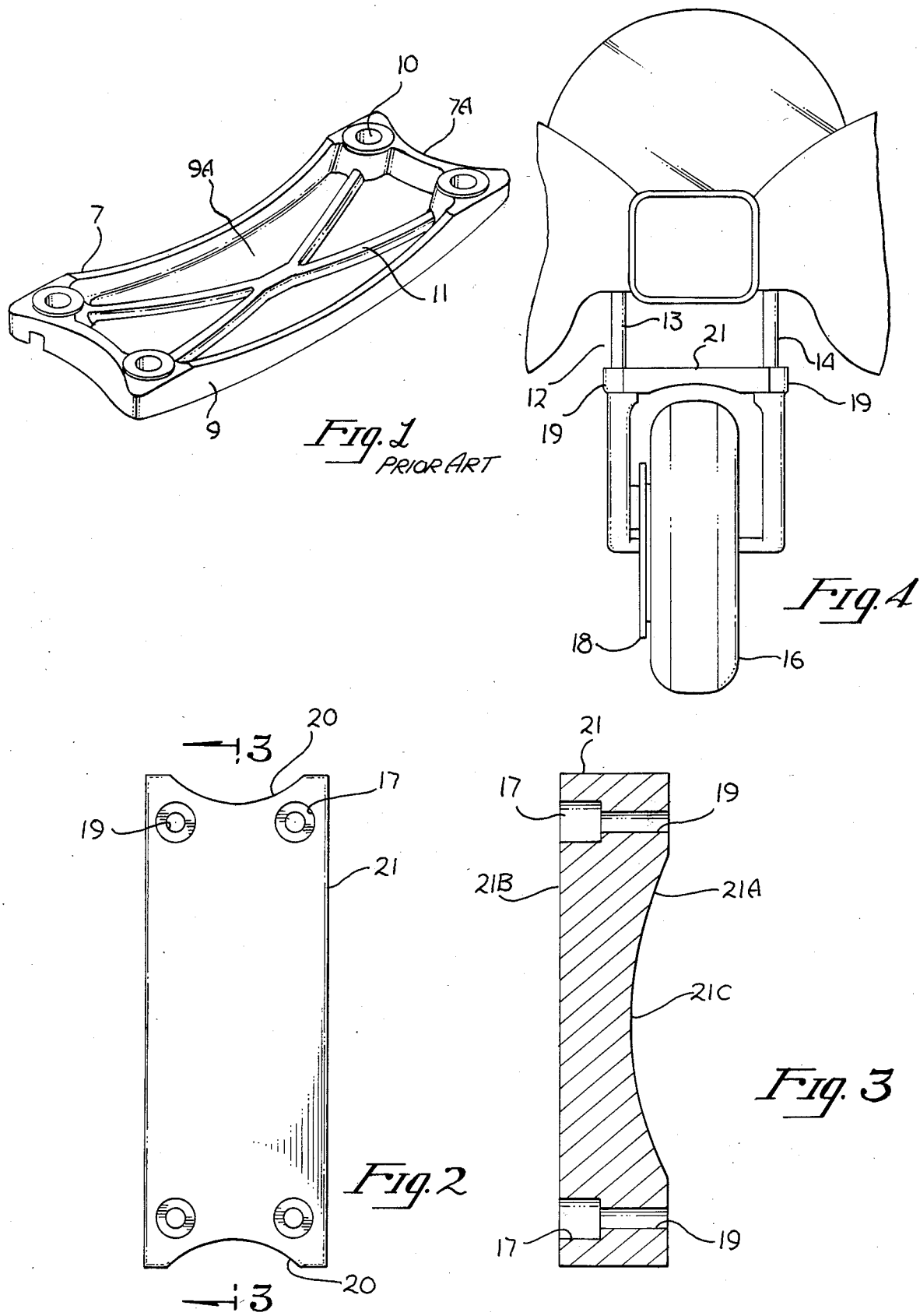

FORK STABILIZER FOR MOTORCYCLE

FIELD OF THE INVENTION

The present invention relates to fork stabilizers and, more particularly, to fork stabilizers for motorcycles.

BACKGROUND OF THE INVENTION

Over the years, motorcycles have increasingly gained popularity. Correspondingly, improvements in motorcycle technology relating to improving handling and stability of the motorcycle during its ride has been direly sought. A critical component of stability in operation of the motorcycle is the front-end assembly comprising a two-pronged fork, which is attached to the front wheel and which is also connected to the steering mechanism of the motorcycle. During braking and turning, the fork assembly is intended to keep the two prongs of the motorcycle fork from turning or twisting in different directions or at different rates, such that steering and braking of the bike remains constant and smooth. A component of prior art front-end fork assemblies is a fork bridge which is adapted to fit between the two prongs of the motorcycle fork above the "slider" unit thereof. More specifically, prior art fork bridges have a hollow and thin contour and are typically comprised of cast aluminum. Such prior art fork bridges allow the fork prongs to flex and turn independent of one another, which the forks were not designed to do. Since sideload pressure exerted on one or the other fork prong during operation of the motorcycle (i.e. during driving) can, depending on load, speed and degree of curve, braking, torque, etc., reach up to 30,000 pounds per square inch, it will be appreciated that a motorcycle front-end fork assembly must be able to adequately resist twisting forces of great magnitude.

However, a critical and unsolved problem of motorcycles employing prior art stabilizers is the inability of such stabilizer bars to prevent the non-parallel twisting and turning of the prongs of the motorcycle steering fork. Such instability occurs during braking, due to the fact that the braking caliber is disposed on one side of the front wheel of the motorcycle and also while turning, due to the fact that the slant that the motorcycle experiences during a turn places a much greater angular stress on one or the other of the two prongs of the front steering fork. The inability of the prior art fork bridge to control the twisting of the forks causes a loss of control during steering and braking, thereby often resulting in a complete loss of control of the motorcycle and resulting injury to the driver. Accordingly, proper stabilization of motorcycles remains a critical and unsolved problem.

SUMMARY OF THE INVENTION

It has been discovered that the afore-described instability of front end fork assemblies may be overcome by replacing the prior art fork bridge with an apparatus designed to act as a stabilizer for the two prongs of the motorcycle fork. Accordingly, the afore-described obstacles and drawbacks contained in prior art motorcycle front-end fork assemblies are overcome in a stabilizer, for the front-end fork of a motorcycle the fork stabilizer including a means for resisting twisting forces which act against the front-end fork of a motorcycle when the motorcycle is turning or braking. The means for resisting said twisting forces include an elongate member, comprised of unitary metallic material having a substantially solid cross-sectional area, the elongate member also having curved areas disposed at each end of the elongate member, said curved area being adapted to make a net fit between the prongs of the front-end fork of the motorcycle, whereby the twisting forces are substantially reduced, thereby assuring smooth and continuous operation and steering of said front-end fork.

BRIEF DESCRIPTION OF THE DRAWINGS

In FIG. 1 there is shown a perspective bottom plan view of a prior art front-end fork bridge for a motorcycle;

In FIG. 2 there is shown a top plan view of a stabilizer bar for a motorcycle employing the concepts of the present invention;

In FIG. 3 there is shown a side cross-sectional view of the motorcycle bar of FIG. 2 taken along lines 3—3;

In FIG. 4 there is shown the present invention as installed on the front fork of a motorcycle.

DETAILED DESCRIPTION OF THE PREFERRED EMBODIMENT

In FIG. 1 there is shown a bottom plan view of a prior art fork bridge for the front fork of a motorcycle, generally denoted by reference numeral 7. The motorcycle fork bridge 7 is installed between the prongs of the front fork of the motorcycle above the slider mechanism and is typically comprised of cast aluminum. The prior art motorcycle bridge 7 is also comprised of an exterior casing 9 which, as shown in FIG. 1, is hollow and defines a hollow interior region 9A. Each end of the prior art bridge 7 is inwardly curved in order to mate with the reciprocally curved surface of each prong of the motorcycle fork. Disposed within each corner of the prior art bridge 7 is a bolt hole 10 which is adapted to receive bolts which threadably engage with threaded bores disposed in a seat portion of the motorcycle fork assembly and which thereby secure the fork bridge 7 between the two prongs of the motorcycle front-end assembly, such that the curved ends 7A are adjacent each prong of the motorcycle fork.

Disposed within the interior hollow region 9A of the fork bridge 7 is a cross-beam structure 11. However, during operation of the prior art motorcycle bridge 7, it has been found that the hollow interior casing design which depends upon the cross-beam structure 11 in order to lend stability to the hollow interior region 9A of the bridge 7, is ineffective in preventing twisting and turning of the prongs of the front-end fork of a motorcycle.

Specifically, during operation, the hollow casing tends to flex and twist, when installed, thereby allowing the prongs of a front-end fork of a motorcycle to twist and turn in a non-parallel fashion, thereby causing the afore-mentioned problems of instability and lack of control of the motorcycle while driving.

Also, due to the casting and poor machining tolerances of the prior art bridge, the stabilizer is usually, on the average, 0.150 to 0.200 inches short of being a net fit between the curved ends of the bridge 7 and the curved ends of the bridge 7 and the two prongs of the motorcycle fork, which also contributes to a lack of stability in motorcycles using such a prior art bridge.

In FIG. 2 there is shown a top plan view of a fork stabilizer embodying the concepts of the present invention, which is generally denoted by reference numeral 21. In FIG. 3 there is shown a cross-sectional sideview of the invented motorcycle stabilizer of FIG. 2 taken along lines 3—3. In FIG. 4 there is shown the invented motorcycle fork stabilizer 21 installed on the front-end fork of a motorcycle. The foregoing description of the present invention will be made with reference to FIGS. 2-4.

In the preferred embodiment, the stabilizer 21 is comprised of a hot forged 6061 grade aluminum bar which is heat-treated to a T6 condition then precision machined to the dimensions shown in FIGS. 2 and 3. The grade and heat treatment of the aluminum lends great strength to the stabilizer 21.

The invented motorcycle stabilizer 21 has inwardly curved transverse areas 20 at each end thereof, as shown in FIG. 2. The curved areas 20 are adapted to mate with the inner curved surfaces 19 of the front fork 12, as shown in FIG. 4.

The motorcycle stabilizer 21 also has an inwardly curved longitudinal surface area 21A which, when installed on a motorcycle front-end fork 12, is disposed above the front tire 16 of the motorcycle, as shown in FIG. 4. However, it will be appreciated that the curved region 21A can be eliminated from the construction of the present invention such that a straight edge is present mirroring the straight edge 21B of the topside of the motorcycle stabilizer 21. Bolt recesses 17 are disposed within the motorcycle stabilizer 21 at each corner thereof and have a restricted bore portion 19 which, together with recessed portion 17, are machined to retain a bolt snugly therewithin. In contrast, due to poor tolerances of the prior art motorcycle bridge 7 of FIG. 1, the bolt holes 10 thereof are typically 0.047 inches larger than the bolts that are used to attach the stabilizer 7 to the front-end fork of a motorcycle, thereby adding to the poor stabilizing characteristics thereof.

The stabilizer 21 of the present invention is not produced by casting, but rather is precision machined to the desired dimensions from a solid bar of hot forged aluminum, such that the transverse curved areas 20 make a net fit between the fork prongs 13 and 14 of the motorcycle front-end 12 of FIG. 4. Also, the bolt recesses and bores 17 and 19 are more closely machined to provide a more snug fit with the bolts disposed therewithin.

Moreover, the invented stabilizer 21 is not constructed in a hollow fashion, but is rather a solid cross-section 21C which also greatly contributes to the stability of the motor cycle fork assembly 12 as compared to the prior art fork bridge 7 of FIG. 1.

It will therefore be appreciated that the invented stabilizer 21 greatly resists twisting and turning forces that the fork experiences while the motorcycle is being driven during braking and turning, thereby preventing the prongs 13 and 14 of the motorcycle fork assembly 12 from twisting out of alignment from one another in a non-parallel fashion, thereby also greatly enhancing the smooth operation and control that a driver exerts over the steering of the motorcycle while driving.

It will also be appreciated that the above-described invention may be embodied in other specific forms without departing from the spirit or essential characteristics thereof. The present embodiments are, therefore, to be considered in all aspects as illustrative and not restrictive, the scope of the invention being indicated by the appended claims rather than by the foregoing description, and all changes which come within the meaning and range of equivalency are, therefore, intended to be embraced therein.

I claim:

1. A fork stabilizer for the front-end fork assembly of a motorcycle of the type having brackets connected adjacent to the upper ends of the bottom case prongs of the fork assembly, each bracket having a substantially flat upper face substantially parallel to the corresponding face of the other bracket with each bracket having two bracket mounting holes through the face thereof collectively arranged in a predetermined pattern, said fork stabilizer comprising;

an elongate member comprised of unitary metallic material having a substantially solid cross-sectional area, said elongate member having first and second substantially coplanar mounting surfaces adjacent each end thereof, each mounting surface for positioning flat against said upper faces of said fork brackets, said elongate member having a pair of stabilizer mounting holes therethrough adjacent each end thereof and passing through a respective mounting surface, said stabilizer mounting holes being arranged in said predetermined pattern and having a diameter to provide a snug fit with mounting bolts for passing therethrough into the brackets of the fork assembly, said elongate member having first and second ends accurately proportioned and spaced to fit closely between and partially capture the upper ends of the bottom case prongs of the front-end fork assembly of the motorcycle, whereby the bottom case groups are maintained substantially parallel during braking, turning and other distributing influences by the rigidity of the fork stabilizer in torsion, the entrapment of the upper ends of the prongs of the bottom cases by the fork stabilizer and by the fastening of the fork stabilizer to the brackets with bolts which prevent slippage with respect thereto to prevent the upper ends of the bottom case prongs from at least partially slipping out of the fork stabilizer ends.

2. The fork stabilizer of claim 1 wherein said first and second ends of said elongate member each has a cylindrical arc conforming to the periphery of said upper ends of said bottom cases for closely fitting thereagainst and encircling the same by an angle of not more than 180°.

3. A fork stabilizer according to claim 1 wherein said elongate member is substantially comprised of 6061 hot forged aluminum.

4. The fork stabilizer according to claim 3 wherein said aluminum is heat treated to a T6 condition.

* * * * *